United States Patent Office 3,589,871
Patented June 29, 1971

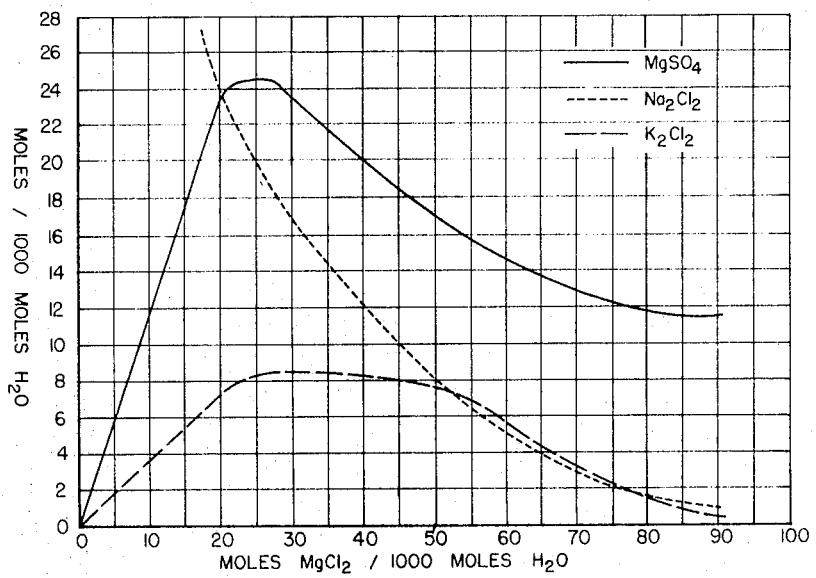
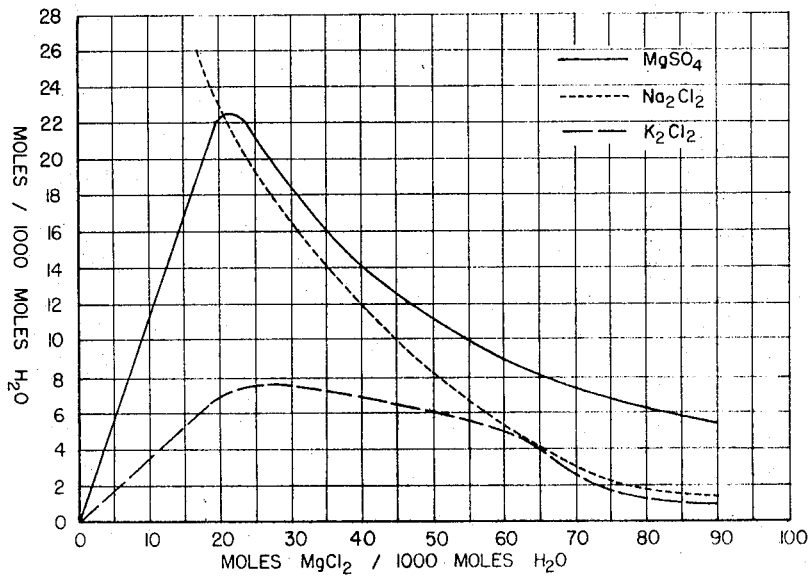

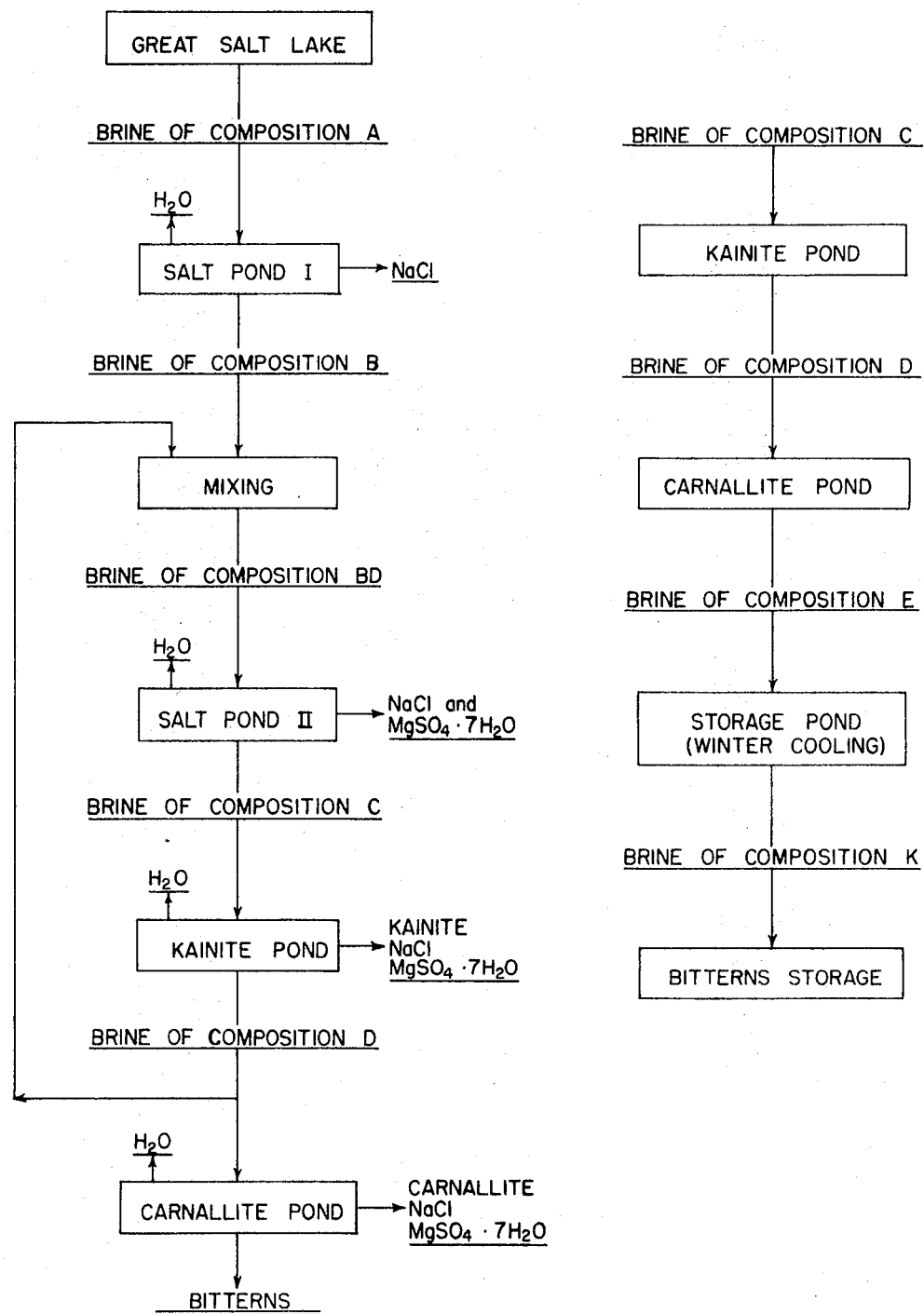

3,589,871
METHOD FOR THE PRODUCTION OF HIGH-GRADE KAINITE
Ulrich E. G. Neitzel, Ogden, Utah, assignor to Great Salt Lake Minerals and Chemicals Corporation, New York, N.Y.
Filed June 10, 1968, Ser. No. 735,840
Int. Cl. B01d 9/00; C13k 1/10
U.S. Cl. 23—298
21 Claims

ABSTRACT OF THE DISCLOSURE

Natural brines, such as those from the Great Salt Lake of Utah, are subjected to evaporation in a pond until they are saturated with potassium salts. The brine is then transferred to a mixing pond wherein it is mixed with a second brine which contains a higher molar ratio of magnesium to potassium. The thus-adjusted brine is subjected to pond evaporation to precipitate sodium chloride until it is again saturated with respect to potassium salts. The brine is then transferred to another pond wherein it is subjected to further evaporation to precipitate kainite. The kainite is precipitated until carnallite begins to form, at which time the brine is transferred to another pond and is subjected to additional evaporation to precipitate carnallite. Some of the kainite-depleted brine is recycled to the mixing pond. After carnallite has precipitated, in the evaporation pond, the residual brine is transferred to deep storage and subjected to winter cooling to precipitate additional carnallite. The precipitated carnallite is converted to kainite by contacting it with kainite-saturated brine.

BACKGROUND OF THE INVENTION

Field

This invention relates to the recovery of potassium values from brines. It is specifically directed to the recovery of kainite from natural brines, such as those of the Great Salt Lake in Utah.

State of the art

It is known to evaporate natural brines to cause the precipitation of potassium-containing salts. Efforts have been made to obtain potash fertilizers and other commercial compounds from natural brines taken from the Great Salt Lake of Utah, but none of these efforts has been commercially successful. Potassium is present in the brine in very small amounts, considerably below 1 percent by weight, whereas other, less desirable constituents, such as magnesium, sodium, chloride, and sulfate are present in larger amounts.

When natural brines are exposed to solar evaporation for sufficient time to concentrate the brines beyond the saturation level of the dissolved potassium salts, the precipitate formed is a complex mixture of salts. The total precipitate contains a very small amount of potassium, on the order of only a few percent. Because potassium is present as a mixture of a variety of potassium minerals, further processing of the precipitate to recover potassium sulfate or potassium chloride is necessarily complicated. In addition, the transport of the low-grade mixture from the solar ponds to the processing plant is expensive.

It is further known that the precipitate formed by the evaporation of natural brines contains a lower proportion of potassium during the initial stages of precipitation, increasing in grade during subsequent precipitation. Thus, it has been proposed to evaporate the brines until the low-grade precipitate has been formed and then to remove the brine to a separate pond for the recovery of the high-grade portion of the precipitate. In theory, a plant feed which is relatively high in potassium content is isolated in this fashion. Such a procedure is in fact impractical, however, because the loss of potassium to the low-grade precipitate represents too substantial a percentage of the total potassium in the brine, e.g., 40 percent or more, much more than has heretofore been recognized.

U.S. Patent 1,593,038 teaches the recycle of magnesium chloride bitterns, i.e., the residual liquor obtained from a solar pond precipitation process, to a potassium-saturated liquor to force potassium chloride out of solution. This patent is directed, however, to the treatment of chloride brines which contain little, if any, sulfate. It is further known from Indian Patent No. 67,461 to extract potassium chloride from a mixture of sodium chloride, magnesium sulfate, and potassium chloride with hot magnesium chloride bitterns and to then cool the hot solution to obtain carnallite. It is also known to mix bitterns brine containing a high concentration of $MgCl_2$ with bitterns of lower $MgCl_2$ concentration to precipitate a mixed salt containing about equal amounts of potassium chloride and sodium chloride at lower brine densities than would be required to precipitate the mixed salt by evaporating the low-$MgCl_2$ bitterns brine.

To produce potassium sulfate product, it is desirable to provide a processing plant with a feed which contains an as-high-as-possible concentration of potassium and an as-high-as-possible concentration of sulfate, but as little as possible of the other constituents in the brine, particularly sodium, chloride, magnesium, and water of hydration. The plant feed should also contain as high a percentage as possible of the potassium values in the initial brine. None of the prior art processes adequately achieves these objectives. The aforedescribed patents, for example, produce products which contain no sulfate.

SUMMARY OF THE INVENTION

The present invention avoids the precipitation of potash-lean fractions and produces kainite of high grade, i.e., a crystal product which contains a high percentage of kainite and little sodium chloride. In this fashion suitable feed material for a potassium sulfate plant is obtained without discarding previously precipitated potassium. The kainite product contains an increased percentage of the potassium initially present in the natural brine. Preferred embodiments of the invention involve the recovery of carnallite from the kainite-depleted brines and subsequent conversion of the carnallite to kainite. According to these embodiments, substantially all of the potassium initially present in the natural brine is recovered as kainite.

According to this invention, natural brines containing dissolved sodium, potassium, magnesium, chloride, and sulfate in proportions such that schoenite crystallizes from solution prior to kainite as the brine is evaporated are subjected to mixing and evaporation steps in a sequence selected to avoid the precipitation of schoenite. A natural brine is subjected to evaporation until it is substantially saturated with respect to potassium, i.e., until schoenite either begins to or is about to begin to precipitate from solution. The composition of the brine is then adjusted by mixing magnesium chloride solution therewith to increase the ratio of magnesium to potassium in the brine. When this mixture is evaporated, sodium chloride precipitates until there is produced a residual brine which is again saturated with respect to potassium. Sufficient magnesium chloride is preferably added to the schoenite-saturated brine during the mixing step to adjust the composition of the brine to the kainite region of the phase diagram descriptive of the particular brine. Thus, continued evaporation of the residual brine results in the crystallization of potassium in the form of kainite.

The kainite-depleted brine is desirably removed from the kainite crystal crop and subjected to further evaporation to produce a carnallite crystal crop. Additional carnallite may be recovered from the concentrated carnallite brine by subjecting the brine to cooling. Cooling of the brine is conveniently accomplished by holding the brine in a storage pond during the winter months. By the combined procedures of evaporation and cooling, it is often practical to crystallize substantially all of the potassium remaining in the kainite-depleted brine as carnallite. The remaining bitterns may be discarded or treated for the recovery of magnesium values.

If, desired, the carnallite in the carnallite crystal crops may be converted to kainite by contacting the crystal crop with a brine of composition suitable for the purpose. The brine should contain a high concentration of sulfate, preferably on the order of at least about 18 moles per 1000 moles of water. The brine should also have a low Na to K ratio, preferably less than about 1.5, ideally less than about 1.2, to avoid the precipitation of NaCl. Any such brine containing less than about 63, preferably less than about 60 moles $MgCl_2$ per 1000 moles $H_2O$ may be used. A particularly satisfactory brine for this purpose is the kainite-concentrated residual brine described hereinbefore. When brines more concentrated with respect to $MgCl_2$ than this residual brine are employed, a greater volume of brine is required to decompose the carnallite. The use of less concentrated brines results in forwarding additional NaCl through subsequent steps of the process.

The carnallite crystal crop may contain variable amounts of other soluble sulfate minerals in admixture with the carnallite. In addition, sulfate is present in any brine entrained in the crystal crop. Thus, the amount of sulfate required to be added with the brine to convert carnallite to kainite is variable. Insufficient sulfate results in incomplete conversion. Too much sulfate results in the production of free $MgSO_4 \cdot 7H_2O$, which is undesirable in the plant feed because of the high proportion of crystal water therein.

To obtain good conversion of carnallite to kainite, a total of at least about 1½ moles of dissolved sulfate should be present for each mole of carnallite. It is generally preferable to introduce no more brine than is required for efficient conversion of the carnallite. Thus, brine is usually added to the carnallite crystal crop in amounts to provide a total of about 1½ to about 2 moles of sulfate per mole of carnallite in the crystal crop. All of the kainite produced from the initial natural brine may then be combined for feed to a potassium sulfate plant.

Although the invention is particularly useful for the processing of natural brines with compositions similar to brines from the Great Salt Lake of Utah, it has application to natural or artificial brines generally which contain significant quantities of magnesium chloride, magnesium sulfate, sodium chloride and potassium chloride.

It is well understood by those skilled in the art that the specific minerals referred to by name herein and in the claims are discrete substances having characteristic X-ray diffraction patterns, physical properties, and chemical compositions. Although it is recognized that individual ions are contained within a mineral crystal in spatial relationships dependent upon the structure of the mineral itself, it is nevertheless conventional to describe the chemical composition of a mineral as a combination of inorganic salts, often including crystal water. According to this practice, the minerals referred to herein and in the claims have chemical compositions as follows:

Kainite: $KCl \cdot MgSO_4 \cdot 2.75H_2O$
Schoenite: $K_2SO_4 \cdot MgSO_4 \cdot 6H_2O$
Carnallite: $KCl \cdot MgCl_2 \cdot 6H_2O$
Bischofite: $MgCl_2 \cdot 6H_2O$

DESCRIPTION OF THE DRAWING

In the drawings, which illustrate what is presently contemplated as the best mode of practicing the invention:

FIG. 4, a graph plotting the concentration of $MgSO_4$, $K_2Cl_2$, and $Na_2Cl_2$ vs. the concentration of $MgCl_2$ in average brine taken from the Great Salt Lake during July;

FIG. 5, a similar graph representing brine taken from the Great Salt Lake in October;

FIG. 6, a flowsheet illustrating embodiments of the invention employing a recycle brine stream; and FIGS. 7 and 8, flowsheets illustrating embodiments of the invention which include the production and decomposition of carnallite.

DESCRIPTION OF THE ILLUSTRATED EMBODIMENTS

Figure 1:
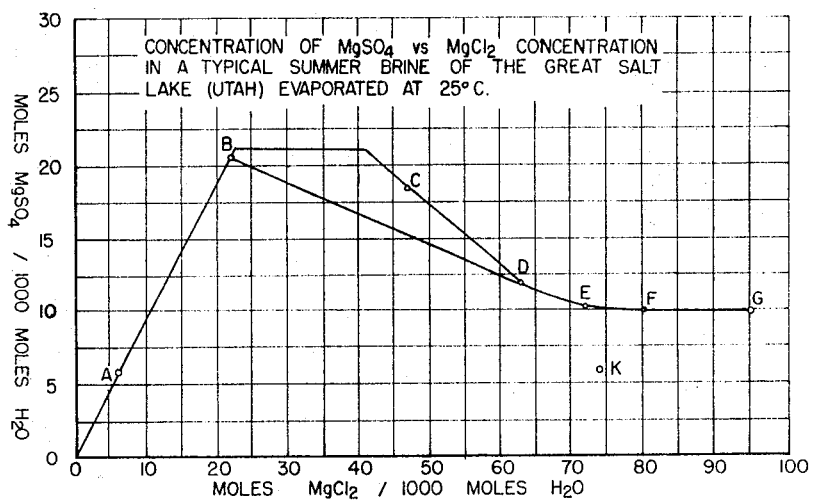
FIG. 1 is a graph plotting the concentration of $MgSO_4$ vs. the concentration of $MgCl_2$ in a typical summer brine taken from the Great Salt Lake.
Figure 2:
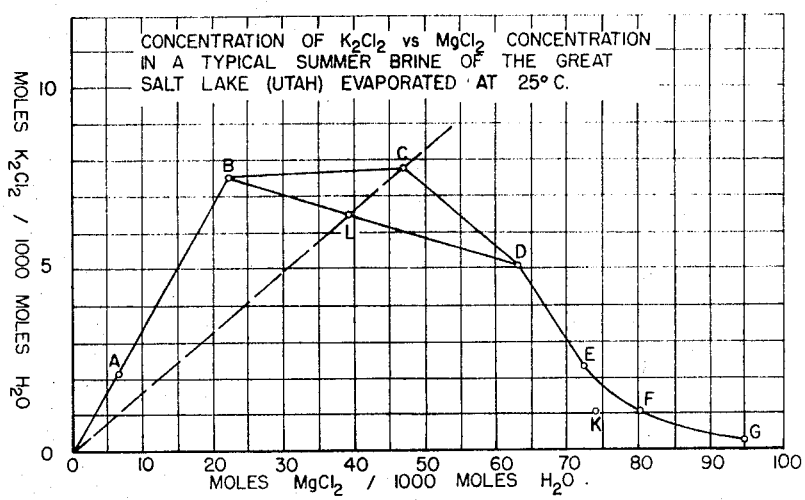
FIG. 2, a similar graph plotting the concentration of $K_2Cl_2$ vs. the concentration of $MgCl_2$ in the same brine.
Figure 3:
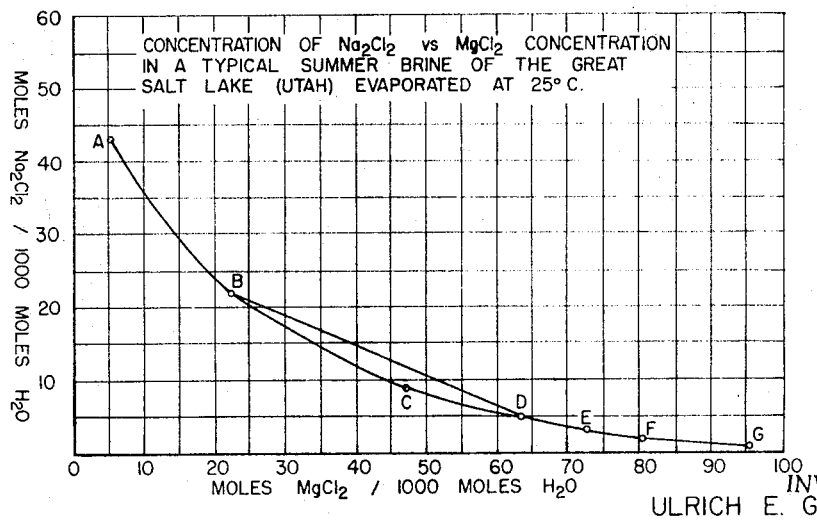
FIG. 3, a similar graph plotting the concentration of $Na_2Cl_2$ vs. the concentration of $MgCl_2$ in the same brine.

Referring to FIGS. 1, 2 and 3, the process will be described with reference to the typical summer curves illustrated. The reference letters on each curve represent the specific brine compositions obtained when the brine is evaporated at 25° C. Like reference letters refer to the identical brine composition at the indicated concentration of $MgCl_2$. Table 1 describes the nature of the several brines specifically designated on the concentration curves and reports the compositions of each.

TABLE I.—COMPOSITION OF CHARACTERISTIC BRINES

| Reference letter | Description of brine | Weight percent | | | | |
|---|---|---|---|---|---|---|
| | | $SO_4$ | Mg | K | Na | Cl |
| A | From Great Salt Lake | 2.2 | 1.2 | 0.7 | 8. | 14.8 |
| B | Schoenite begins to precipitate. | 7.5 | 4 | 2.2 | 3.9 | 14. |
| C | Kainite begins to precipitate. | 6.6 | 5.9 | 2.2 | 1.5 | 16.8 |
| D | Carnallite begins to precipitate. | 4.3 | 6.8 | 1.5 | 0.9 | 22.5 |
| E | Intermediate carnallite brine. | 4.1 | 7.5 | 0.8 | 0.5 | 20.4 |
| F | Carnallite-depleted brine. | 3.6 | 8.1 | 0.3 | 0.3 | 21.6 |
| G | Bischofite begins to precipitate. | 3.5 | 9.1 | 0.1 | 0.2 | 25.0 |
| K | Resulting from cooling brine E to 0° C. | 2.2 | 7.4 | 0.3 | 0.5 | 21.1 |

The drawings and Table 1 are illustrative only. Thus, it should be understood that the curves of FIGS. 1, 2 and 3 are merely close approximations. Although it is convenient to describe the brines defined by the drawings as in Table 1, these descriptions refer to gross effects. For example, it is likely that some schoenite is actually precipitated along with kainite in the region of the curves designated CD. As a practical matter, however, any schoenite which may form is quickly converted to kainite. Thus, brines defined by points on the curves close to points C are considered to be schoenite-depleted and saturated with respect to kainite. Similarly, brines defined by points on the curves close to points D are considered to be kainite-depleted and carnallite-saturated. For convenience, the following disclosure ignores minor details which are insignificant commercially and emphasizes the gross reactions and effects which must be understood to practice the invention.

From Table 1 and the drawings, it is seen that as the brine is evaporated from composition A to composition B, sodium chloride precipitates from solution. Upon further evaporation, additional sodium chloride, together with magnesium sulfate hydrate and schoenite, precipitates from solution until the composition of the brine reaches points C. The precipitate recovered along the lines BC is of very low grade with respect to potassium, containing on the order of 4 percent by weight, based on the oven dried weight of the precipitate. By "oven dried weight" is meant the weight absent free moisture. The precipitate may, however, contain as much as 40 percent of the potassium present in the initial brine. Further evaporation along the lines CD results in the precipitation of kainite, together with additional sodium chloride and magnesium sulfate hydrate. The kainite crystal product is of considerably higher grade with respect to potassium, containing as much as about 8 to about 12 percent potassium, on the aforestated basis. More importantly, the crystal crop contains relatively less sodium chloride, which is undesirable, and relatively more magnesium sulfate hydrate, of which the sulfate moiety is desirable, as constituents in the feed composition delivered to a potassium sulfate plant. Unfortunately, the kainite crystal crop contains only about 30 to about 40 percent of the potassium in the initial brine. Evaporation along the lines DE results in the precipitation of additional sodium chloride, magnesium sulfate hydrate, and carnallite. Although carnallite is obtained in relatively high-grade, the mineral itself contains one molecule of $MgCl_2$ and six molecules of crystal water for each molecule of KCl. The carnallite crystals are generally quite small and are produced from a relatively viscous brine. Thus, this crystal crop includes a high percentage of entrained brine, containing additional water and $MgCl_2$. Both $MgCl_2$ and crystal water are undesirable constituents in the feed composition for a potassium sulfate plant. Free water may also be undesirable. Further evaporation, along the lines EF, results in the crystallization of additional carnallite of lower grade, due to the concurrent precipitation of magnesium sulfate hexahydrate and other salts. At points F and beyond, the precipitate includes only a minor amount of potassium salts because the majority of the potassium has already precipitated from solution. At points G, the solubility of magnesium chloride in the solution is exceeded and bischofite crystallizes.

According to the present invention, brine from the Great Salt Lake is manipulated at various stages of evaporation to produce high-grade kainite to the substantial exclusion of schoenite. Carnallite is also produced but is decomposed and converted to kainite to exclude magnesium chloride from the crystal product. In this fashion, most of the potassium in the initial brine is recovered in a kainite crystal product which contains suitable proportions of KCl and $MgSO_4$ for the production of $K_2SO_4$.

FIG. 6 illustrates the claimed manipulation of natural brines which results in the enhancement of grade of the potash product produced, as well as the maximization of the total recovery of potassium from the brine. Thus, feed brine is pumped from the Great Salt Lake to a salt pond wherein it is subjected to solar evaporation in accordance with usual practice until it is concentrated sufficiently to be substantially saturated with respect to potassium salts, i.e., until its composition is approximately that defined by points B of FIGS. 1, 2, and 3. As a consequence, a substantial quantity of the NaCl in the feed brine is crystallized. Brine of this composition is then mixed with recycled brine having composition corresponding approximately to points D of the figures. The composition of the brine is thereby adjusted to correspond to a point lying on the lines BD. The precise location of the composition on the lines BD depends upon the proportions in which the brines are mixed. Although benefits are realized over a wide range of mixtures, the highly preferred mixing ratio is that which results in a brine composition of approximately point L (FIG. 2). When a brine of this composition is evaporated, it becomes saturated with potassium salts at approximately points C, the composition at which kainite begins to precipitate from solution. Thus, the entire schoenite solid phase field is avoided, so that potassium which would normally have crystallized as schoenite crystallizes as kainite instead. Compositions which are relatively closer to B on lines BD produce some schoenite and increased quantities of NaCl when they are evaporated. Compositions which lie closer to D on the lines BD produce no schoenite when they are evaporated, but they yield proportionately less kainite and more carnallite, because they become saturated with potassium only after they become relatively more concentrated with respect to $MgCl_2$.

It is within contemplation that solutions other than the recycled brines illustrated in FIG. 6 may be mixed with brine of composition B. Any aqueous solution which contains as principal constituents the constituents of the brine being evaporated and which additionally has a higher mole ratio of Mg to K than does brine B may be mixed with brine B to produce a brine composition which lies below the lines BCD of FIGS. 1 and 2 and above the line BCD of FIG. 3. In any event, it is preferred to adjust the brine composition to a point which lies approximately on a line connecting points O and C of the figures, so that upon evaporation the solution will become saturated with potassium salts at approximately point C.

Contrary to previous suggestions which involve recycling concentrated $MgCl_2$ brines to force KCl from solution, it is preferred to recycle brines less concentrated with respect to $MgCl_2$. In any event the recycled brine should contain less than about 72 moles $MgCl_2$ per 1000 moles $H_2O$. Recycling of solutions in the carnallite composition region, i.e., compositions defined by points on the lines DE, results in the production of greater proportions of carnallite. Brines containing no more than about 63 moles $MgCl_2$ per 100 moles $H_2O$ are thus preferred for recycle. According to the highly preferred embodiments of this invention, brine effluent from a salt pond (composition B) is mixed with a portion of the brine effluent from a kainite pond (composition D) to produce a brine of composition L. The thus-adjusted brine is subjected to solar evaporation in a second salt pond thereby causing the precipitation of additional sodium chloride and some epsomite until the brine is again saturated with respect to potassium, i.e., until the composition of the brine is approximately that defined by points C of the drawings. Brine of this composition is forwarded to one or more kainite ponds wherein it is subjected to further evaporation to precipitate kainite, together with some NaCl and epsomite, until its composition corresponds approximately to point D. A portion of this brine (composition D) is recycled in suitable proportion to the mixing procedure, as described hereinbefore. The remainder of the brine of composition D is withdrawn from the kainite pond and forwarded to one or more carnallite ponds wherein it is subjected to further evaporation and/or cooling to produce carnallite.

Carnallite and kainite may be mixed and fed to a plant for the production of potash salts, or the carnallite may be treated to produce additional kainite. The conversion of carnallite to kainite is a separate inventive feature which may be practiced either independently or in conjunction with the aforedescribed procedure for avoiding the precipitation of schoenite.

Figure 8:
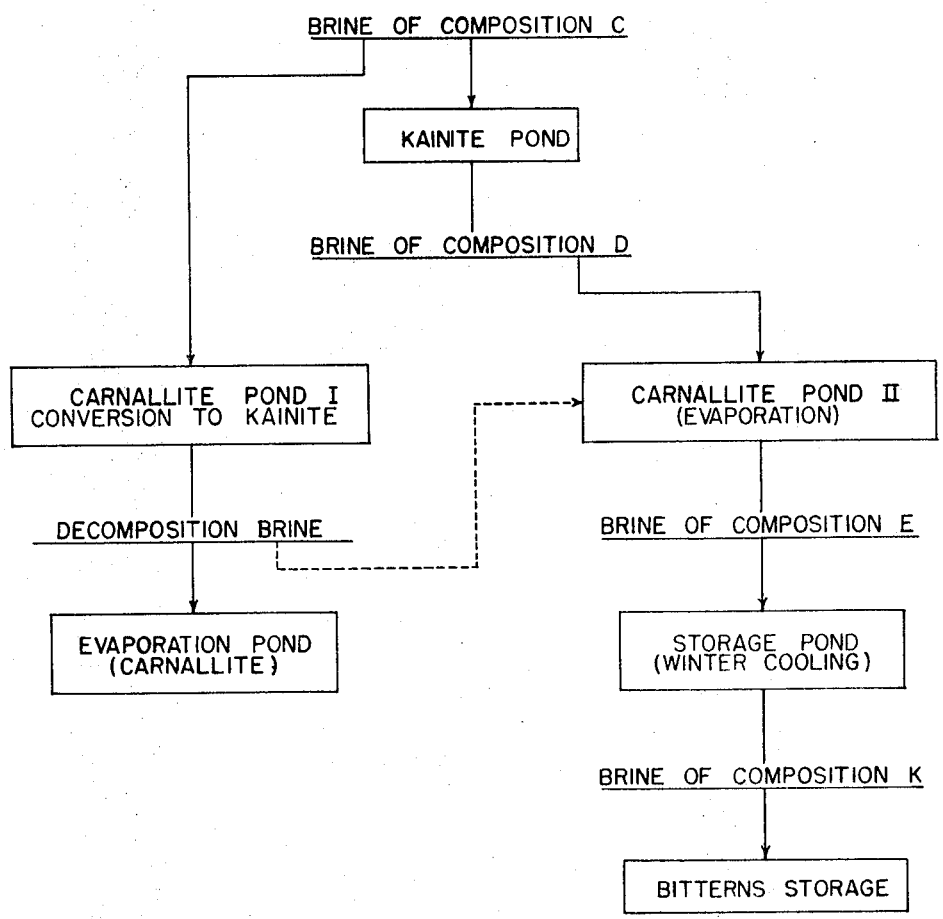

As illustrated by FIG. 7, brine from the kainite ponds (composition D) is transferred to carnallite pond I wherein it is subjected to further evaporation to crystallize carnallite. Brine at composition E is removed from carnallite pond I and forwarded to a storage pond. Periodically, brine D is diverted from carnallite pond I and fed to carnallite pond II as illustrated by FIG. 8. Carnallite pond I is then drained of brine, after which, brine of composition C is fed to carnallite pond I to convert the carnallite to kainite. The brine resulting from the decomposition of carnallite may then be subjected to further evaporation in carnallite pond I to produce additional kainite. The kainite-depleted decomposition brine is then removed and further evaporated to produce additional carnallite. One convenient method of accomplishing this additional carnallite production is to cycle the kainite-depleted decomposition brine from carnallite pond I to carnallite pond II. While carnallite pond I is used as a decomposition pond, brine of composition D from the kainite pond is forwarded to carnallite pond II for evaporation. Brine of composition E from carnallite pond II is then forwarded to the storage pond. The storage pond brine is subjected to cooling during the winter season, thereby resulting in additional carnallite crystallization. During the coldest part of the season, the brine, which is approximately at composition K, is drained from the storage pond and forwarded to bitters storage. The carnallite crystal crop remaining in the storage pond is then decomposed by contact with brine C in the same fashion as the other carnallite is decomposed.

An alternative method of converting the carnallite to kainite is to drain the brine from the carnallite crystal crop; re-dissolve the carnallite crystal crop in water; and recycle the resulting carnallite solution to the kainite ponds. This recycle has very little effect on the shapes of the curves illustrated by FIGS. 1, 2 and 3. Thus, rather than contacting the carnallite with residual, i.e., kainite-concentrated, brine from the salt ponds, the carnallite is recycled in solution to enrich this residual brine. Kainite is precipitated from the enriched residual brine in normal fashion, i.e., by subjecting the brine to evaporation.

The curves presented in FIGS. 4 and 5 indicate the effect of climatological variations on the brines of the Great Salt Lake. Although the detailed shapes of the curves vary significantly from month to month, their general relative shapes remain similar. Accordingly, the procedures outline in connection with FIGS. 1, 2 and 3 are effective through the operating season. Brines from other sources may also be treated following the instructions of this disclosure, even though the points designated A through L on the figures correspond to somewhat different concentrations of $MgCl_2$. Any brine which is defined by concentration curves shaped generally as those of FIGS. 1, 2, and 3 may be manipulated in accordance with this invention to recover as kainite substantially all of the potassium initially in solution.

The following examples are further illustrative of the invention:

Example I.—Summer brine from the Great Salt Lake of Utah is pumped as feed brine to a salt pond. The brine is subjected to solar evaporation until it is concentrated to 22 moles $MgCl_2$ per 1000 moles $H_2O$. 36.8 moles $Na_2Cl_2$ are precipitated and 717.3 moles $H_2O$ are evaporated per 1000 moles $H_2O$ in the feed brine. The thus-concentrated brine is mixed with recycled, kainite-depleted brine, containing about 63 moles $MgCl_2$ per 1000 moles $H_2O$, at a ratio of about 3 to 2, respectively, to produce an adjusted brine composition of about 40 moles $MgCl_2$ per 1000 moles $H_2O$. The adjusted brine is then pumped to a second salt pond and subjected to evaporation to precipitate 3.54 moles $Na_2Cl_2$ and 0.62 moles $MgSO_4 \cdot 7H_2O$ per 1000 moles $H_2O$ in the feed brine, thereby producing a residual brine with a concentration of about 47 moles $MgCl_2$ per 1000 moles $H_2O$. The residual brine is pumped to a kainite pond and subjected to further evaporation until the brine is concentrated to about 63 moles $MgCl_2$ per 1000 moles $H_2O$. 3.25 moles kainite, 0.70 moles $MgSO_4 \cdot 7H_2O$, and 2.18 moles $Na_2Cl_2$ per 1000 moles $H_2O$ in the feed brine are precipitated. A total of an additional 165.0 moles $H_2O$ per 1000 moles $H_2O$ in the feed brine are evaporated in the second salt pond and the kainite pond. The major portion, about 70 percent, of the kainite-depleted brine is recycled to the mixing pond and the remainder is forwarded to a carnallite pond. Further evaporation in the carnallite pond results in the precipitation of 0.65 moles carnallite, 0.26 moles $Na_2Cl_2$, and 0.36 moles $MgSO_4 \cdot 6H_2O$ per 1000 moles $H_2O$ in the feed brine. Brine at a concentration of about 72 moles $MgCl_2$ per 1000 moles $H_2O$ is then sent to a storage pond. The brine is held in the storage pond until winter. When the brine temperature reaches aobut 0° C, it is pumped to a bitters storage pond, leaving behind in the pond a crystal product containing about 0.25 moles carnallite, essentially no $Na_2Cl_2$ and about 0.48 mole $MgSO_4 \cdot 7H_2O$, per 1000 moles $H_2O$ in the initial feed brine.

Example II.—After a period of operation in accordance with Example I, the carnallite pond is drained and brine similar to the residual brine of Example I, which contained 47 moles MgCl per 1000 moles $H_2O$, is pumped into the pond. The composition of this brine, in moles per 1000 moles $H_2O$, is about:

$MgSO_4$ ---------------------------------------- 18.5
$MgCl_2$ ----------------------------------------- 47.0
$K_2Cl_2$ ----------------------------------------- 7.66
$Na_2Cl_2$ --------------------------------------- 9.0

Sufficient brine is pumped to the pond to provide a total of about 2 moles of $MgSO_4$ per mole of carnallite in the total crystal product, including entrained brine. Within 5 days the carnallite is substantially completely decomposed and converted to kainite. About 1.1 moles of kainite are harvested for each mole of carnallite in the crystal product. The decomposition brine resulting from the process analyzes, in moles per 1000 moles $H_2O$, about:

$MgSO_4$ ---------------------------------------- 12
$MgCl_2$ ----------------------------------------- 60
$K_2Cl_2$ ----------------------------------------- 5.4
$Na_2Cl_2$ --------------------------------------- 5

This brine is pumped to a solar evaporated pond wherein it ih allowed to stand until it is concentrated to about 63 moles $MgCl_2$ per 1000 moles $H_2O$. As a result, additional kainite and carnallite is produced.

The invention may be practiced in a batch or continuous fashion. Although solar evaporation is presently considered most economical, other methods of evaporating the brines may be employed in place of, or in conjunction with, solar evaporation. For clarity, the examples have specified brines of certain optimum concentration of $MgCl_2$. It should be recognized that while these concentrations are optimum for the particular brine disclosed, slightly different concentrations are preferred at different seasons of the year and when a feed brine of somewhat different composition is employed.

Although this invention has been described with particular reference to details of certain specific embodiments, reference to these details is not intended to limit the scope of the claims. Many modifications which do not depart from the inventive teachings of this disclosure will be suggested to those skilled in the art by this disclosure.

I claim:
1. The method of producing kainite from natural brines containing dissolved sodium, potassium, magnesium, chloride, and sulfate in proportions such that when the brine evaporates at ambient temperatures the first potassium-containing minerals with which it becomes saturated also contain sulfate, and choenite ($K_2SO_4 \cdot MgSO_4 \cdot 6H_2O$) crystallizes before kainite ($KCl \cdot MgSO_4 \cdot 2.75H_2O$), which comprises:

subjecting the brine to evaporation to produce a brine more concentrated with respect to potassium than is the natural brine;

mixing with said concentrated brine an aqueous solution containing both dissolved potassium and dissolved magnesium but in a molar ratio of magnesium to potassium higher than the corresponding ratio in the concentrated brine and containing less than about 72 moles of $MgCl_2$ per 1000 moles of water to produce an adjusted brine containing a higher molar ratio magnesium to potassium than the corresponding ratio in said concentrated brine;

subjecting the adjusted brine to evaporation to cause the precipitation of sodium chloride and the formation of a residual brine;

collecting the residual brine;

subjecting the residual brine to evaporation to cause the precipitation of a high grade kainite crystal crop therefrom and the formation of a kainite-depleted brine; and separating the kainite-depleted brine from the kainite.

2. The method of claim 1 wherein the aqueous solution contains no more than about 63 moles of $MgCl_2$ per 1000 moles of water.

3. The method of claim 2 wherein the aqueous solution is kainite-depleted brine resulting from the precipitation of kainite.

4. The method of claim 1 wherein kainite-depleted brine is subjected to evaporation, cooling or both evaporation and cooling to cause the precipitation of carnallite and the formation of a bitterns brine; and the bitterns brine is separated from the carnallite.

5. The method of claim 4 wherein the carnallite is contacted with residual brine resulting from the precipitation of sodium chloride from the adjusted brine to cause the decomposition of carnallite.

6. The method of claim 4, wherein the carnallite is redissolved in water and recycled to enrich the residual brine from which kainite is precipitated.

7. The method of claim 4 wherein a portion of the kainite-depleted brine resulting from the precipitation of kainite is mixed with the concentrated brine resulting from the evaporation of the natural brine while another portion is treated to produce carnallite.

8. The method of claim 1 wherein the natural brine is brine from the Great Salt Lake of Utah.

9. The method of claim 1 wherein the natural brine is subjected to evaporation to precipitate sodium chloride until there is produced a concentrated brine substantially saturated with respect to potassium salts;
the concentrated brine is separated, mixed with kainite-depleted residual brine, and subjected to further evaporation to precipitate additional sodium chloride until there is produced a residual brine substantially saturated with respect to kainite;
the residual brine is separated and subjected to further evaporation to precipitate kainite and to form a kainite-depleted brine; and
kainite is separated from the kainite-depleted brine.

10. The method of claim 9 wherein the natural brine is brine from the Great Salt Lake of Utah; the kainite-depleted brine is mixed with concentrated brine to produce an adjusted brine containing about 40 moles magnesium chloride per 1000 moles of water; the adjusted brine is subjected to evaporation to cause the precipitation of sodium chloride until there is produced a residual brine containing about 47 moles magnesium chloride per 1000 moles of water; and the residual brine is separated and subjected to evaporation to cause the precipitation of kainite until there is produced kainite-depleted residual brine containing about 63 moles magnesium chloride per 1000 moles of water.

11. The method of claim 10 wherein the concentrated brine is produced by subjecting the natural brine to evaporation until the concentration of magnesium chloride therein is about 22 moles magnesium chloride per 1000 moles of water.

12. The method of recovering kainite from a natural brine described by concentration curves for $MgSO_4$, $K_2Cl_2$ and $Na_2Cl_2$ shaped relative each other generally as FIGS. 1, 2 and 3, respectively, of the drawings which comprises: subjecting the brine to evaporation until its composition is substantially as defined by points B of said figures; adjusting the composition of said brine to a composition defined by respective points no higher than lines BCD of FIGS. 1 and 2, but above said line of FIG. 3; recovering said adjusted brine and subjecting it to evaporation until the composition of the brine is substantially that defined by the intersections of lines BCD with lines extending from points O through said respective points; separating said brine and subjecting it to further evaporation to precipitate kainite from said brine until its composition is substantially that defined by points D of said figures; and separating the kainite-depleted brine from the kainite.

13. The method of claim 12, wherein the composition of the adjusted brine is such that upon evaporation it acquires a composition substantially as defined by the intersections of lines extending from O through the respective composition points with lines CD.

14. The method of claim 12, wherein brine with composition substantially as defined by points B of FIGS. 1, 2, and 3 is mixed with brine with composition substantially as defined by points D in proportions to produce an adjusted brine with composition substantially as defined by the intersection of lines OC with lines BD; the adjusted brine is subjected to evaporation to precipitate sodium chloride until the composition of the residual brine is substantially as represented by points C; and thereafter, kainite is recovered from the residual brine.

15. The method of claim 14, wherein the residual brine is separated and subjected to evaporation to precipitate kainite until its composition is substantially as defined by points D of FIGS. 1, 2, 3; brine of said composition is separated and subjected to evaporation to precipitate carnallite until the composition of said brine is substantially as represented by points E; and the carnallite is separated from said brine.

16. The method of claim 15, wherein brine of composition defined by points E is subjected to cooling to precipitate carnallite.

17. The method of claim 15, wherein the carnallite is contacted with brine of composition substantially as defined by points C to decompose the carnallite and to produce kainite.

18. The method of producing kainite from a natural brine described by concentration curves for $MgSO_4$, $K_2Cl_2$, and $Na_2Cl_2$ shaped relative each other generally as FIGS. 1, 2, and 3, respectively, which comprises subjecting brine of composition substantially as defined by corresponding points on lines DE of said figures to evaporation, cooling or both evaporation and cooling to precipitate carnallite; separating the carnallite from the carnallite-depleted brine; and contacting the carnallite with brine of composition substantially as defined by corresponding points on lines DE of said figures to evaporation, cooling or both evaporation and cooling to precipitate carnallite; separating the carnallite from the carnallite-depleted brine; and contacting the carnallite with brine composition substantially as defined by corresponding points on lines CD to convert carnallite to kainite.

19. The method of claim 18, wherein the carnallite is contacted with brine of composition substantially as defined by points C of FIGS. 1, 2, and 3.

20. The method of claim 19, wherein the brine contains about 63 moles of $MgCl_2$ per 1000 moles $H_2O$ and results from the evaporation of Great Salt Lake brine; said brine is evaporated to a concentration of about 73 moles $MgCl_2$ per 1000 moles $H_2O$ thereby to produce a carnallite crystal crop; and carnallite-depleted brine is removed from the carnallite precipitate.

21. The method of claim 20, wherein the carnallite-depleted brine is subjected to winter cooling to produce a second carnallite crystal crop.

References Cited

UNITED STATES PATENTS

| 1,156,388 | 10/1915 | Bradburn | 23—298 |
| 1,353,283 | 9/1920 | Silsbee | 23—297 |
| 2,687,339 | 8/1954 | Dancy et al. | 23—38 |
| 3,099,528 | 7/1963 | Hadzeriga | 23—38 |
| 3,323,875 | 6/1967 | Been | 23—299 |
| 3,484,195 | 12/1969 | Lewis et al. | 23—121 |

FOREIGN PATENTS 67,461  9/1959  India.

WILBUR L. BASCOMB, JR., Primary Examiner

U.S. Cl. X.R.

23—302, 304, 38, 121, 300; 159—1S

PO-1050
(5/69)

UNITED STATES PATENT OFFICE
CERTIFICATE OF CORRECTION

Patent No. 3,589,871        Dated June 29, 1971

Inventor(s) Ulrich E. G. Neitzel

It is certified that error appears in the above-identified patent and that said Letters Patent are hereby corrected as shown below:

Col. 6, line 26, change "100" to ---1000---;

Col. 8, line 23, change "ih" to ---is---;

Claim 1, line 6, change "choenite" to ---schoenite---.

Signed and sealed this 2nd day of November 1971.

(SEAL)
Attest:

EDWARD M. FLETCHER, JR.            ROBERT GOTTSCHALK
Attesting Officer                    Acting Commissioner of Patents